(12) United States Patent
Lin et al.

(10) Patent No.: US 11,053,345 B2
(45) Date of Patent: Jul. 6, 2021

(54) POLYURETHANE POLYMER, METHOD FOR PREPARING THE SAME AND USE THEREOF

(71) Applicant: ELECTRIC POWER RESEARCH INSTITUTE OF GUANGDONG POWER GRID CO., LTD., Guangdong (CN)

(72) Inventors: Musong Lin, Guangdong (CN); Tiansheng Chen, Guangdong (CN); Qiang Fu, Guangdong (CN); Shengping Fan, Guangdong (CN); Lei Peng, Guangdong (CN)

(73) Assignee: ELECTRIC POWER RESEARCH INSTITUTE OF GUANGDONG POWER GRID CO., LTD., Guangzhou (CN)

( * ) Notice: Subject to any disclaimer, the term of this patent is extended or adjusted under 35 U.S.C. 154(b) by 262 days.

(21) Appl. No.: 16/088,078

(22) PCT Filed: Dec. 27, 2017

(86) PCT No.: PCT/CN2017/118900
§ 371 (c)(1),
(2) Date: Sep. 25, 2018

(87) PCT Pub. No.: WO2019/037369
PCT Pub. Date: Feb. 28, 2019

(65) Prior Publication Data
US 2020/0332053 A1    Oct. 22, 2020

(30) Foreign Application Priority Data
Aug. 22, 2017 (CN) .......................... 201710724492.2

(51) Int. Cl.
*C08G 18/76* (2006.01)
*C08G 18/12* (2006.01)
(Continued)

(52) U.S. Cl.
CPC ......... *C08G 18/7671* (2013.01); *C08G 18/12* (2013.01); *C08G 18/4018* (2013.01);
(Continued)

(58) Field of Classification Search
CPC ..................... C08G 18/10; C08L 75/04–08
See application file for complete search history.

(56) References Cited

U.S. PATENT DOCUMENTS 3,563,957 A   2/1971   Beebe et al.
4,831,098 A * 5/1989   Watanabe .......... C08G 18/0814
                                                    528/45

(Continued)

FOREIGN PATENT DOCUMENTS

CN    1161049 A      10/1997
CN    101031594 A    9/2007
(Continued)

OTHER PUBLICATIONS

Lelah et al. Polyurethanes in Medicine. Chapter 3: Polyurethane Chemistry. CRC Press. Published Mar. 31, 1986. (Year: 1986).*
(Continued)

*Primary Examiner* — Michael M Dollinger

(57) ABSTRACT

The present invention relates to the technical field of polymer materials, and in particular, relates to a polyurethane polymer and a method for preparing the same and use thereof. The present invention discloses use of aminoimidazolinone-based compound in preparing an end-capped polyurethane polymer product, by which the polyurethane polymer capable of achieving repeated self-healing for multiple times without adding any self-healing agent and any
(Continued)

external stimulation can be prepared. The present invention further provides a polyurethane polymer capable of achieving repeated self-healing for multiple times without any external stimulation and having a compressive strength restored to at most 96% of the one before compression, and a method for preparing the same.

7 Claims, 3 Drawing Sheets

(51) Int. Cl.
*C08G 18/40* (2006.01)
*C08G 18/42* (2006.01)
*C08G 18/48* (2006.01)
*C08G 18/73* (2006.01)
*C08G 18/75* (2006.01)

(52) U.S. Cl.
CPC ..... *C08G 18/4238* (2013.01); *C08G 18/4825* (2013.01); *C08G 18/4854* (2013.01); *C08G 18/73* (2013.01); *C08G 18/755* (2013.01)

(56) References Cited

U.S. PATENT DOCUMENTS

| 2005/0176848 | A1 | 8/2005 | Chen et al. |
| 2008/0221272 | A1 | 9/2008 | Tournilhac et al. |
| 2011/0034593 | A1* | 2/2011 | Gonzalez Leon ...... C04B 26/26 524/59 |
| 2013/0261255 | A1 | 10/2013 | Deyrail et al. |
| 2016/0304658 | A1 | 10/2016 | Trentesaux et al. |

FOREIGN PATENT DOCUMENTS

| CN | 103168079 | A | 6/2013 |
| CN | 105482065 | A | 4/2016 |
| CN | 106133019 | A | 11/2016 |
| CN | 106279619 | A | 1/2017 |
| CN | 106589287 | A | 4/2017 |
| CN | 107383332 | A | 11/2017 |
| WO | WO-9710274 | A1 * | 3/1997 ......... C08G 18/4676 |

OTHER PUBLICATIONS

Machine Translation of CN 105482065 (Year: 2020).*
Pripol 2033, Product Details, https://www.crodasmartmaterials.com/en-gb/product-finder/product/212-Pripol_1_2033 (Year: 2021).*
Radia 7282. SpecialChem. https://adhesives.specialchem.com/product/m-oleon-radia-7282 (Year: 2021).*
First Office Action dated Nov. 4, 2019 for Chinese patent application No. 201710724492.2, English translation provided by Global Dossier.
International Search Report for PCT/CN2017/118900 dated May 22, 2018, ISA/CN.
Anastassija Wittmer et al, Moisture-Mediated Intrinsic Self-Healing of Modified Polyurethane Urea Polymers, Journal of Polymer Science Part A : Polymer Chemistry, vol. 56, Dec. 7, 2017 (Dec. 7, 2017), pp. 537-548.
Young Joo Kim et al, Synthesis of Self-Healing Polyurethane Urea-Based Supramolecular Materials, Journal of Polymer Science Part B : Polymer Physics, vol. 53, Dec. 31, 2015 (Dec. 31, 2015), pp. 468-474.

* cited by examiner

POLYURETHANE POLYMER, METHOD FOR PREPARING THE SAME AND USE THEREOF

The present application is a US National Phase application based upon PCT Application No. PCT/CN2017/118900, filed Dec. 27, 2017, which claims priority of Chinese Patent Application No. 201710724492.2, entitled "POLYURETHANE POLYMER, METHOD FOR PREPARING THE SAME AND USE THEREOF", filed on Aug. 22, 2017 with the State intellectual Property Office of People's Republic of China, the entire content of which is incorporated herein by reference.

FIELD

The present invention relates to the technical field of polymer materials, and in particular, a polyurethane polymer, method for preparing the same and use thereof.

BACKGROUND

Since polymer materials are in a state of long-term stress and influence of light, heat and ultraviolet light in the external environment during the use, it is easy to form microcracks which are difficult to detect in polymer materials. On one hand, the microcracks in polymer materials may weaken the function of these materials because the ultraviolet light and the like is allowed to penetrate these materials, and thereby leading to the failure in the function of these materials, even the cracks are very small. On the other hand, the microcracks may spread into visible cracks as the time of use prolongs because the microcracks are difficult to detect, and structural and functional failures may lead to disastrous consequences. Cracks in polymer materials may also shorten the service life of the materials severely, thereby causing a lot of waste (D. Y. Wu, S. Meure and D. Solomon, Prog. Polym. Sci., 2008, 33, 479).

Polyurethane has good adjustability such that a series of polymer materials from rigid materials to soft materials can be obtained by adjusting the ratio of soft segment and hard segment, and thus has a wide application in modern society. Inspired by the behavior that natural organisms are able to repair themselves after sustaining damage, in recent years, the research on the preparation of self-healing materials has received great attention (Hia et al., Polym Rev 2016, 56, 225). Scientists have designed many kinds of self-healing materials based on methods of embedding healing agents (Trask et al., JR Soc Interface 2007, 4, 363), introducing dynamic covalent bonds (Wei et al., Adv Funct Mater 2015, 25, 1352) or supramolecular chemistry (Nakahata et al., Macromol Rapid Comm 2016, 37, 86), for example, ultraviolet light-induced dynamic disulfide bonds are introduced to build self-healing polyurethane elastomers in which the original Young's modulus can be almost reached under the irradiation of ultraviolet light (Q. Shaobo et al. Adv. Mater. 2015, 27, 7740-7745), or furan and maleimide groups which can achieve the ring opening of D-A reaction by heating are introduced to obtain a certain degree of self-healing effect (Chao Zeng et al. Macromolecules 2013, 46, 1794-1802). However, the implementation of such self-healing processes requires the addition of a self-healing agent and the times of self-healing are less, or external stimulation such as heat, light, and water are required to stimulate the healing process. Currently, there are few reports about the polyurethane polymer capable of achieving repeated self-healing for multiple times at room temperature without adding any self-healing agent and any external stimulation.

SUMMARY

In view of the above, the present invention discloses use of aminoimidazolinone-based compound as a chain extender in preparing a polyurethane polymer, by which the polyurethane polymer capable of achieving repeated self-healing for multiple times without adding any self-healing agent and any external stimulation can be prepared.

The present invention provides use of aminoimidazolinone-based compound in preparing polyurethane polymer products.

The present invention provides use of aminoimidazolinone-based compound in preparing end-capped polyurethane polymer products.

Preferably, according to the use in claim 2, it is characterized in that the aminoimidazolinone-based compound is 1-(2-aminoethyl)-2-imidazolinone.

The present invention further discloses a polyurethane polymer obtained by polymerizing the following raw materials by mole:

| | |
|---|---|
| diol polymer | 2-5 parts; |
| bifunctional isocyanate compound | 3-6 parts; |
| aminoimidazolinone-based compound | 1-3 parts. |

Preferably, the aminoimidazolinone-based compound is 1-(2-aminoethyl)-2-imidazolinone.

Preferably, the diol polymer is one or more selected from the group consisting of polyether diol, polyethylene glycol, polypropylene glycol, polybutylene glycol, polytetrahydrofuran, polyhexanediol neopentyl glycol ester and polytetrahydrofuran ether glycol, wherein the diol polyether, the polyethylene glycol, the polypropylene glycol, the polybutylene glycol or the polytetrahydrofuran has a molecular weight of 400 to 10000 Daltons.

Preferably, the difunctional isocyanate compound is one or more selected from the group consisting of 1,6-hexamethylene diisocyanate, hexamethyl diisocyanate, toluene diisocyanate, diphenylmethane diisocyanate and isophorone diisocyanate.

More preferably, the diol polymer is polyethylene glycol.

More preferably, the difunctional isocyanate compound is isophorone diisocyanate.

The present invention further discloses a method for preparing a polyurethane polymer, comprising the steps of:

1) reacting a diol polymer with a difunctional isocyanate compound to prepare an isocyanate end-capped prepolymer; and 2) reacting an aminoimidazolinone-based compound with the isocyanate end-capped prepolymer to obtain the polyurethane polymer.

Preferably, a catalyst is further added during step 1) of reacting the diol polymer with the difunctional isocyanate compound, and the catalyst is one or more selected from the group consisting of triethylamine, organobismuth and dibutyltin dilaurate.

Preferably, the aminoimidazolinone-based compound of step 2) is 1-(2-aminoethyl)-2-imidazolinone.

Preferably, the diol polymer of step 1) comprises one or more of polyether diol, polyethylene glycol, polypropylene glycol, polybutylene glycol, polytetrahydrofuran, polyhexanediol neopentyl glycol ester and polytetrahydrofuran ether glycol, wherein the polyether diol, the polyethylene glycol, the polypropylene glycol, the polybutylene glycol or the polytetrahydrofuran has a molecular weight of 400 to 10000 Daltons.

Preferably, the difunctional isocyanate compound of step 1) is one or more selected from the group consisting of 1,6-hexamethylene diisocyanate, hexamethyl diisocyanate, toluene diisocyanate, diphenylmethane diisocyanate and isophorone diisocyanate.

More preferably, the diol polymer of step 1) is polyethylene glycol. In a specific example of the present invention, the diol polymer is specifically one or more of polytetrahydrofuran ether glycol having a molecular weight of 1000 g/mol, polypropylene glycol having a molecular weight of 1000 g/mol, polyethylene glycol having a molecular weight of 3000 g/mol, polybutylene glycol having a molecular weight of 2000 g/mol, polyethylene glycol having a molecular weight of 600 g/mol and polyhexanediol neopentyl glycol ester having a molecular weight of 2000 g/mol. Preferably, the diol polymer is dried and then reacted with the bifunctional isocyanate compound.

The difunctional isocyanate compound is more preferably one or more selected from the group consisting of diphenylmethane diisocyanate, isophorone diisocyanate and hexamethylene diisocyanate. Most preferably, the difunctional isocyanate compound of step 1) is isophorone diisocyanate.

Preferably, the catalyst is added in an amount of 1-5 wt % of the total amount of the polyurethane polymer.

Preferably, step 1) is carried out under the protection of an inert gas to prepare the isocyanate end-capped prepolymer.

More preferably, the inert gas is argon.

Preferably, a polymerization solution is further added in an amount of 10-40 wt % of the total amount of the polyurethane polymer during reacting the diol polymer and the difunctional isocyanate compound, and the polymerization solution is one or more selected from the group consisting of N,N-dimethylformamide, tetrahydrofuran and acetone.

Preferably, in step 1), the diol polymer is reacted with the difunctional isocyanate compound at a reaction temperature of 30° C. to 100° C. for a reaction time of 1 to 5 hours.

Preferably, in step 2), the aminoimidazolinone-based compound is reacted with the isocyanate end-capped prepolymer at a reaction temperature of 40° C. to 80° C. for a reaction time of 1 to 5 hours.

More preferably, in step 2), the aminoimidazolinone-based compound is reacted with the isocyanate end-capped prepolymer at a reaction temperature of 70° C. for a reaction time of 1.5 hours.

In a specific example of the present invention, the aminoimidazolinone-based compound is reacted with the isocyanate end-capped prepolymer at a reaction temperature of 70° C. for a reaction time of 1.5 hours, or at 60° C. for 1.5 hours, or at 70° C. for 1 hour, or at 50° C. for 2 hours.

Preferably, after reacting the aminoimidazolinone-based compound with the isocyanate end-capped prepolymer, step 2) further comprises drying the product of the reaction.

Aminoimidazolinone-based compound has many six-membered heterocyclic rings containing nitrogen and oxygen and amino groups, which are capable of forming a large number of hydrogen bonds with the diol polymer and the difunctional isocyanate compound. This characteristic of aminoimidazolinone-based compound is applied in the end capping during preparing the polyurethane polymer in the present invention. The polyurethane polymer, which is obtained by using aminoimidazolinone-based compound in preparing an end-capped polyurethane polymer product, has strong self-healing ability and service life, and can achieve a certain degree of healing through the movement of the molecular chain upon sustaining damage, thereby greatly improving its life span. The polyurethane polymer of the present invention prepared by using aminoimidazolinone-based compound is a polyurethane polymer that can achieve repeated self-healing at room temperature without adding a self-healing agent and any external stimulation. Furthermore, such a polyurethane polymer can heal its mechanical damages by itself for multiple times without any external stimulation under the temperature of 0° C. to 100° C. and the humidity of 0% to 100%.

BRIEF DESCRIPTION OF THE DRAWINGS

In order to more clearly explain the technical solutions in the examples of the present invention or in the prior art, the drawings used in the description of the examples or the prior art will be briefly described below.

DETAILED DESCRIPTION OF THE EMBODIMENTS

The technical solutions in the examples of the present invention will be described clearly and completely below. It is obvious that the described examples are only a part of the examples of the present invention rather than all of the examples. All other examples obtained by those of ordinary skill in the art based on the examples in the present invention without paying any creative effort are within the scope of protection of the present invention.

The present invention provides a polyurethane elastomer and a preparation method and use thereof, which are used for overcoming the technical defect of the polyurethane polymer in the prior art such as poor self-healing effect and demand for adding an additional self-healing agent, and demand for external stimulation such as heat, light and water to stimulate healing.

The technical solutions in the examples of the present invention will be described clearly and completely below. It is obvious that the described examples are only a part of the examples of the present invention rather than all of the examples. All other examples obtained by those of ordinary skill in the art based on the examples in the present invention without paying any creative effort are within the scope of protection of the present invention.

The reagents used in the examples are all commercially available.

Example 1

The specific steps of Example 1 provided by the present invention are as follows:

1) Preparation of isocyanate end-capped prepolymer: 5 g of PTMG1000 (polytetrahydrofuran ether glycol having a molecular weight of 1000) was dried under vacuum at 110° C. for 2 hours and cooled to 40° C., and 10 ml of anhydrous DMF (N,N-dimethylformamide) was added, and 1.85 g of HDI (hexamethylene diisocyanate) and 700 mg of catalyst DBTL (dibutyltin dilaurate) were added thereto and reacted at 70° C. for 3 hours under the protection of argon to obtain the isocyanate end-capped prepolymer;

2) Preparation of polyurethane polymer: the isocyanate end-capped prepolymer was cooled to 40° C., and a DMF solution containing 260 mg of 1-(2-aminoethyl)-2-imidazolinone dissolved in 2 mL of DMF was added thereto. The resultant was heated to 50° C. and further reacted for 2 hours, and then the chain-extended reactant was thoroughly dried to obtain the polyurethane polymer.

Figure 1:
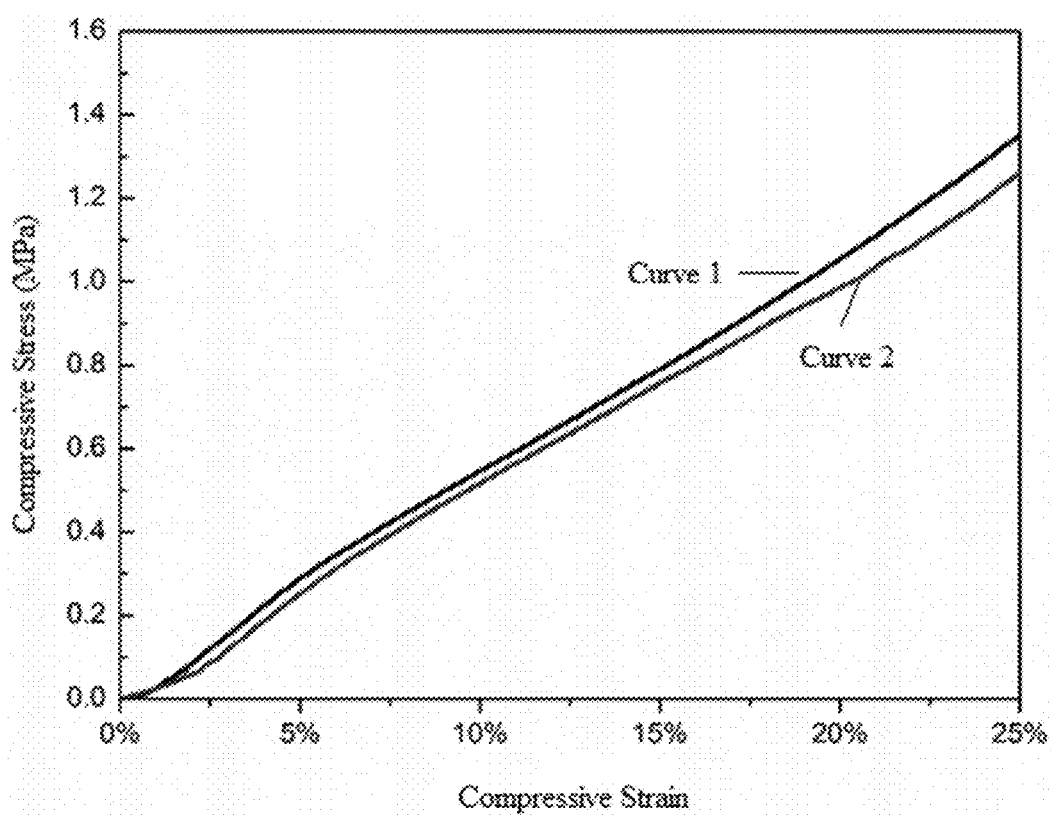
FIG. 1 is the compression test curves of the polyurethane polymer of Example 1 provided in the present invention before and after self-healing.
Figure 2:
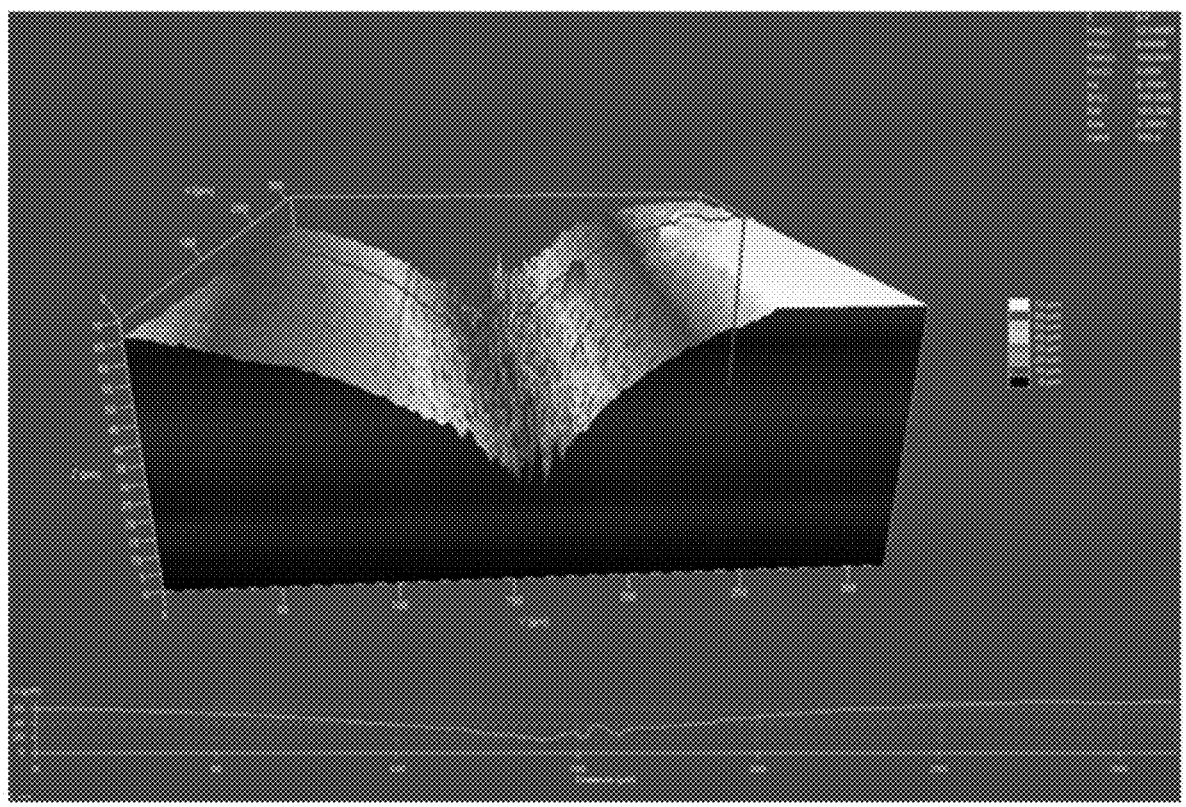
FIG. 2 is the laser confocal diagram of the polyurethane polymer of Example 1 provided in the present invention before self-healing.
Figure 3:
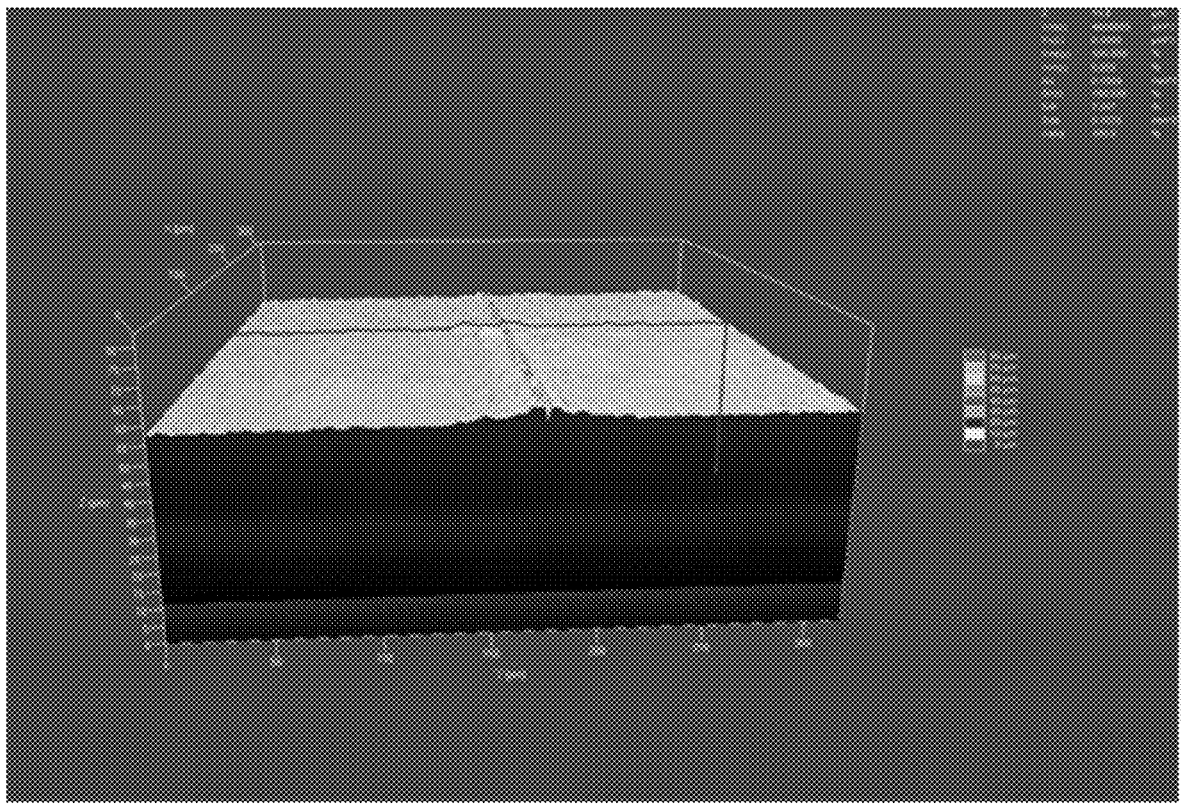
FIG. 3 is the laser confocal diagram of the polyurethane polymer of Example 1 provided in the present invention after self-healing.

FIG. 1 was the compression test curves of the polyurethane polymer of Example 1 provided in the present invention before and after self-healing, wherein curve 1 was the compression curve of the original sample, and curve 2 was the compression curve of the self-healed sample. FIG. 2 was the laser confocal diagram of the polyurethane polymer of Example 1 provided in the present invention before self-healing. And, FIG. 3 was the laser confocal diagram of the polyurethane polymer of Example 1 provided in the present invention after self-healing. Referring to FIGS. 1 to 3, the self-healing experiment of the resultant of Example 1 was carried out by cutting the dried polyurethane polymer with a scalpel and immediately contacting the fractured surfaces together. Immediately thereafter, the polyurethane polymer became a whole capable of withstanding its own weight. After allowing it to stand overnight, it was found that the crack became less deep significantly by observing with a laser confocal microscope. This material was tested on a tensile machine, and it was found that its compressive strength was restored to 93.4% of the original one.

Example 2

The specific steps of Example 2 provided by the present invention are as follows:

1) Preparation of isocyanate end-capped prepolymer: 10 g of PPG1000 (polypropylene glycol having a molecular weight of 1000) was dried under vacuum at 110° C. for 2 hours and cooled to 40° C., and 10 ml of anhydrous DMF (N,N-dimethylformamide) was added, and 2.75 g of MDI (diphenylmethane diisocyanate) and 1.4 g of catalyst DBTL (dibutyltin dilaurate) were added thereto and reacted at 80° C. for 3 hours under the protection of argon to obtain the isocyanate end-capped prepolymer;

2) Preparation of polyurethane polymer: the isocyanate end-capped prepolymer was cooled to 40° C., and a DMF solution containing 0.5 g of 1-(2-aminoethyl)-2-imidazolinone dissolved in 4 mL of DMF was added thereto. The resultant was heated to 50° C. and further reacted for 2 hours, and then the chain-extended reactant was thoroughly dried to obtain the polyurethane polymer.

The self-healing experiment showed that the polyurethane polymer became a whole capable of withstanding its own weight immediately after cutting the dried polyurethane polymer with a scalpel and immediately contacting the fractured surfaces together, and its compressive strength was restored to 92.1% of the original one.

Example 3

The specific steps of Example 3 provided by the present invention are as follows:

1) Preparation of isocyanate end-capped prepolymer: 15 g of PEG3000 (polyethylene glycol having a molecular weight of 3000) was dried under vacuum at 110° C. for 2 hours and cooled to 40° C., and 10 ml of anhydrous tetrahydrofuran was added, and 1.47 g of IPDI (isophorone diisocyanate) and 2 g of catalyst DBTL (dibutyltin dilaurate) were added thereto and reacted at 70° C. for 3 hours under the protection of argon to obtain the isocyanate end-capped prepolymer;

2) Preparation of polyurethane polymer: the isocyanate end-capped prepolymer was cooled to 40° C., and a tetrahydrofuran solution containing 150 mg of 1-(2-aminoethyl)-2-imidazolinone dissolved in 5 mL of tetrahydrofuran was added thereto. The resultant was heated to 70° C. and further reacted for 1 hour, and then the chain-extended reactant was thoroughly dried to obtain the polyurethane polymer.

The self-healing experiment showed that the polyurethane polymer became a whole capable of withstanding its own weight immediately after cutting the dried polyurethane polymer with a scalpel and immediately contacting the fractured surfaces together, and its compressive strength was restored to 92.9% of the original one.

Example 4

The specific steps of Example 4 provided by the present invention are as follows:

1) Preparation of isocyanate end-capped prepolymer: 10 g of polybutylene glycol (having a molecular weight of 2000) was dried under vacuum at 110° C. for 2 hours and cooled to 40° C., and 10 ml of anhydrous acetone was added, and 3.28 g of MDI (diphenylmethane diisocyanate) and 2 g of organobismuth were added thereto and reacted at 80° C. for 3 hours under the protection of argon to obtain the isocyanate end-capped prepolymer;

2) Preparation of polyurethane polymer: the isocyanate end-capped prepolymer was cooled to 40° C., and a acetone solution containing 260 mg of 1-(2-aminoethyl)-2-imidazolinone dissolved in 4 mL of acetone was added thereto. The resultant was heated to 60° C. and further reacted for 1.5 hours, and then the chain-extended reactant was thoroughly dried to obtain the polyurethane polymer.

The self-healing experiment showed that the polyurethane polymer became a whole capable of withstanding its own weight immediately after cutting the dried polyurethane polymer with a scalpel and immediately contacting the fractured surfaces together, and its compressive strength was restored to 88.9% of the original one.

Example 5

The specific steps of Example 5 provided by the present invention are as follows:

1) Preparation of isocyanate end-capped prepolymer: 10 g of PEG (polyethylene glycol having a molecular weight of 600) was dried under vacuum at 110° C. for 2 hours and cooled to 40° C., and 1.47 g of IPDI (isophorone diisocyanate) and 1.2 g of catalyst triethylamine were added thereto and reacted at 70° C. for 3 hours under the protection of argon to obtain the isocyanate end-capped prepolymer;

2) Preparation of polyurethane polymer: the isocyanate end-capped prepolymer was cooled to 40° C., and a acetone solution containing 260 mg of 1-(2-aminoethyl)-2-imidazolinone dissolved in 4 mL of acetone was added thereto. The resultant was heated to 70° C. and further reacted for 1.5 hours, and then the chain-extended reactant was thoroughly dried to obtain the polyurethane polymer.

The self-healing experiment showed that the polyurethane polymer became a whole capable of withstanding its own weight immediately after cutting the dried polyurethane polymer with a scalpel and immediately contacting the fractured surfaces together, and, after allowed to stand overnight at 40° C., its compressive strength was restored to 96.3% of the original one.

Example 6

The specific steps of Example 6 provided by the present invention are as follows:

1) Preparation of isocyanate end-capped prepolymer: 5 g of polyhexanediol neopentyl glycol ester (having a molecular weight of 2000) and 5 g of polytetrahydrofuran ether glycol (having a molecular weight of 2000) were dried under vacuum at 110° C. for 2 hours and cooled to 40° C., and 1.47 g of IPDI (isophorone diisocyanate) and 700 mg of catalyst dibutyltin dilaurate were added thereto and reacted at 90° C. for 3 hours under the protection of argon to obtain the isocyanate end-capped prepolymer;

2) Preparation of polyurethane polymer: the isocyanate end-capped prepolymer was cooled to 40° C., and a acetone solution containing 260 mg of 1-(2-aminoethyl)-2-imidazolinone dissolved in 2 mL of acetone was added thereto. The resultant was heated to 60° C. and further reacted for 1.5 hours, and then the chain-extended reactant was thoroughly dried to obtain the polyurethane polymer.

The self-healing experiment showed that the polyurethane polymer became a whole capable of withstanding its own weight immediately after cutting the dried polyurethane polymer with a scalpel and immediately contacting the fractured surfaces together, and, after allowed to stand overnight, its compressive strength was restored to 90.4% of the original one.

The polyurethane polymers prepared in examples 2 to 6 were similar to that prepared in Example 1, and thus they had a restoration performance similar to that of Example 1. The compressive strength of the polyurethane polymers prepared in the present invention can be restored to at most 96% of the one before compression.

The above descriptions are only preferred embodiments of the present invention. It should be noted that for those of ordinary skill in the art, many improvements and modifications can be made without departing from the principle of the present invention, and these improvements and modifications should be considered within the scope of protection of the present invention.

What is claimed is:

1. A method for preparing a polyurethane polymer, comprising the steps of:
 1) reacting a diol polymer with a difunctional isocyanate compound to prepare an isocyanate end-capped prepolymer; and
 2) reacting an aminoimidazolinone-based compound with the isocyanate end-capped prepolymer of step 1) to obtain the polyurethane polymer;
 wherein amounts of materials for step 1) and step 2) reactions by mole are:
 diol polymer 2-5;
 bifunctional isocyanate compound 3-6; and
 aminoimidazolinone-based compound 1-3;
 and wherein the aminoimidazolinone-based compound is 1-(2-aminoethyl)-2-imidazolinone.

2. The method for preparing the polyurethane polymer according to claim 1, wherein a catalyst is further added in step 1) of reacting the diol polymer and the difunctional isocyanate compound, and the catalyst is one or more selected from the group consisting of triethylamine, organobismuth and dibutyltin dilaurate.

3. The method for preparing the polyurethane polymer according to claim 1, wherein the catalyst is added in an amount of 1-5 wt % of the total amount of the polyurethane polymer.

4. The method for preparing the polyurethane polymer according to claim 1, wherein a polymerization solution is further added in an amount of 10-40 wt % of the total amount of the polyurethane polymer during reacting the diol polymer with the difunctional isocyanate compound, and the polymerization solution is one or more selected from the group consisting of N,N-dimethylformamide, tetrahydrofuran and acetone.

5. The method for preparing the polyurethane polymer according to claim 1, wherein the diol polymer is one or more selected from the group consisting of polyether diol, polyethylene glycol, polypropylene glycol, polybutylene glycol, polytetrahydrofuran, polyhexanediol neopentyl glycol ester and polytetrahydrofuran ether glycol.

6. The method for preparing the polyurethane polymer according to claim 5, wherein the molecular weight of the polyether diol, the polyethylene glycol, the polypropylene glycol, the polybutylene glycol or the polytetrahydrofuran is between 400 and 10000 Daltons.

7. The method for preparing the polyurethane polymer according to claim 1, wherein the difunctional isocyanate compound is one or more selected from the group consisting of 1,6-hexamethylene diisocyanate, toluene diisocyanate, diphenylmethane diisocyanate and isophorone diisocyanate.

* * * * *